Nov. 28, 1933.    R. F. KOHR    1,936,943
BRAKE
Filed April 27, 1931
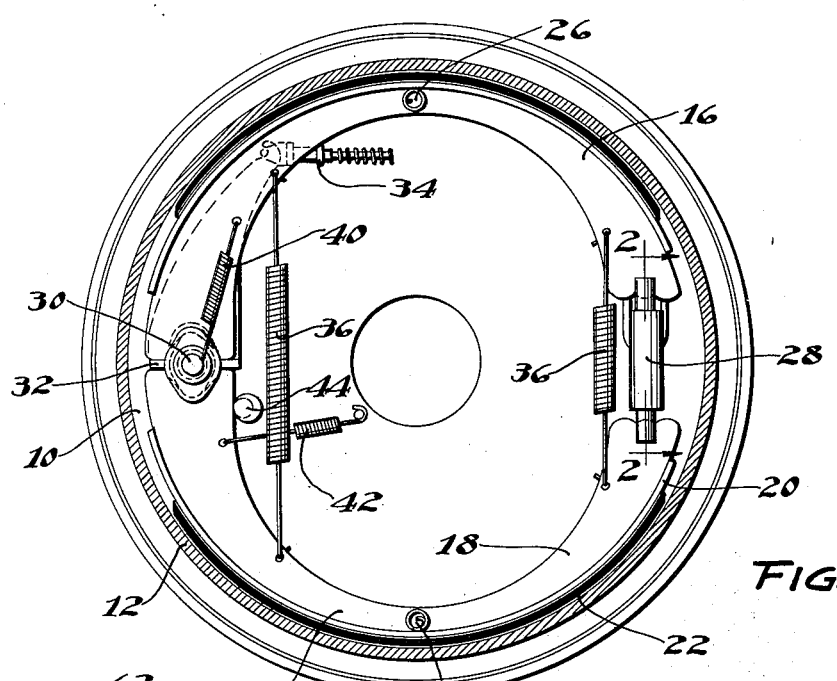
FIG. 1
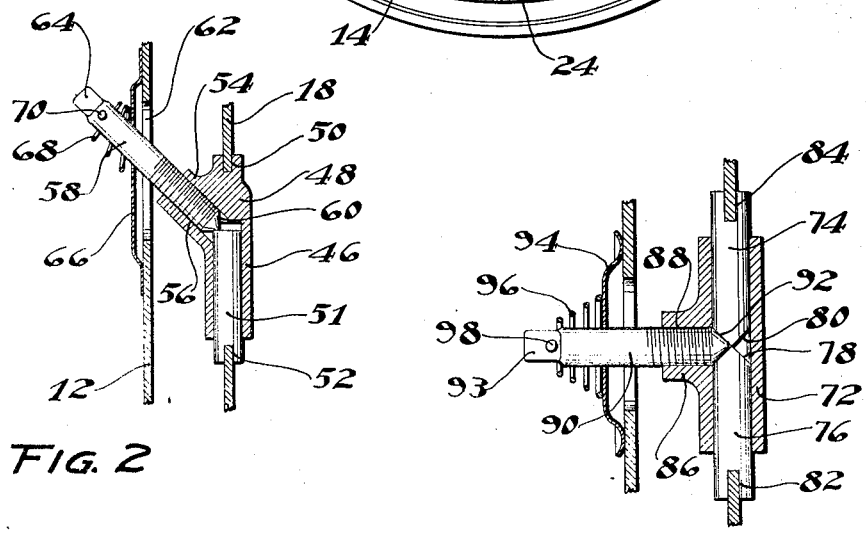
FIG. 2
FIG. 3
INVENTOR.
ROBERT F. KOHR
BY
ATTORNEY.

Patented Nov. 28, 1933

1,936,943

UNITED STATES PATENT OFFICE 1,936,943

BRAKE

Robert F. Kohr, South Bend, Ind., assignor to Bendix Brake Company, South Bend, Ind., a corporation of Illinois Application April 27, 1931. Serial No. 533,244

1 Claim. (Cl. 188—79.5)

This invention relates to brakes and more particularly to internal expanding brakes.

In the illustrated embodiment, the invention is shown as applied to an internal expanding brake including a backing plate, a rotatable drum associated therewith and friction elements arranged on the backing plate for cooperation with the drum, the friction elements comprising two semi-flexible shoes connected at their articulated ends by an adjusting device and have positioned between their separable ends an operating cam suitably connected to a source of power, not shown.

An object of the invention is to provide an expansible member for adjustably connecting the articulated ends of friction elements.

Another object of the invention is to provide an expansible member for connecting friction elements, so that the overall length may be adjusted to compensate for wear.

A further object of the invention is to provide an adjusting device for a friction element which is exceedingly cheap and simple in construction and will efficiently perform its intended function and in which the required amount of mill work may be reduced to a minimum.

Further objects and advantages of the invention reside in the various combinations hereinafter described and claimed as will be apparent upon reference to the following specification and to the accompanying drawing, in which:

Figure 1 is a vertical sectional view of a brake taken just back of the head of the drum illustrating the friction elements in side elevation and showing the invention as applied;

Figure 2 is a vertical sectional view substantially on line 2—2, Figure 1; and

Figure 3 illustrates a modification of the invention.

Referring to the drawing for more specific details of the invention, 10 represents a fixed support such as a backing plate. Associated with the backing plate is a rotatable drum 12. Positioned for movement on the backing plate are interchangeable brake shoes 14 and 16 adaptable for cooperation with the drum. Each of the shoes includes a semi-flexible web 18 supporting a rim 20 to which is suitably secured a lining 22.

As shown, the shoes 14 and 16 are suitably supported on the backing plate on steady rests 24 and 26. The articulated ends of the shoes are connected by an adjusting device 28 and positioned upon the backing plate between the separable ends of the shoes is an anchor 30 having positioned thereon a floating actuating cam 32 connected by a tension member 34 to a source of power, not shown.

The shoes 14 and 16 are connected at their articulated and separable ends by return springs 36, the shoe 16 is connected by an auxiliary return spring 40 to the anchor and an auxiliary spring 42 connects the shoe 14 to a support on the backing plate. This spring normally retains the shoe against an adjustable stop 44.

The adjusting device includes a cylindrical member 46 closed at one end as indicated at 48 and provided with a slot 50 for the reception of the web 18 on one of the shoes. The cylinder has positioned therein a plunger 51 provided with a slot 52 for the reception of the web on the other shoe. Positioned on the cylinder 46 is a boss 54 having a threaded bore 56 communicating with the cylinder and positioned for travel in the bore 56 is a threaded member 58 having a conical end 60 adapted to engage the inner end of the plunger 51.

The threaded member 58 extends through a suitable opening 62 in the backing plate 12 and is provided with a head 64 for the reception of an adjusting wrench, and slipped over the stem of the threaded member is a suitable dust cap 66 secured against displacement by a spring 68 slipped over the threaded member 58 and held in place by a diametral pin 70. It is, of course, to be understood that other means of securing the dust cap against displacement may be employed with equal force and effect.

A modification of the invention is illustrated in Figure 3 wherein a cylindrical member 72 has positioned in its respective ends plungers 74 and 76, the inner ends of which are conical as shown at 78 and 80 and are arranged in opposed relation, the outer ends of the plungers 74 and 76 being provided with slots 82 and 84 adaptable for the reception of the webs 18 on the respective shoes 14 and 16.

The cylindrical member 72 has positioned substantially centrally between the ends thereof a boss 86 provided with a threaded bore 88 and positioned for travel in the bore 86 is a threaded member 90 having a conical end 92 adapted to seat between the conical ends 78 and 80 on the plungers 74 and 76.

The threaded member 90 extends through a suitable opening in the backing plate and is provided upon its free end with a suitable head 93 for the reception of an adjusting wrench. The threaded member 90 has positioned thereon a dust cap 94 adapted to close the opening in the backing plate. The dust cap 94 is pressed into engagement with the backing plate by a spring 96 wound on the threaded member 90 and held against displacement by a diametral pin 98.

In operation, the threaded member 58 (Figure 2) or 90 (Figure 3), as the case may be, is rotated by a suitable adjusting wrench to force the conical end 60 or 92 against the end of the plunger 51 (Figure 2) or between the plungers 74 and 76 (Figure 3) whereupon the plunger or plungers move in the cylinder to increase or decrease the distance between the shoes according to the direction of rotation of the threaded member.

Although this invention has been described in connection with certain specific embodiments, the principles involved are susceptible of numerous other applications that will readily occur to persons skilled in the art. The invention is, therefore, to be limited only as indicated by the scope of the appended claims. It is not my intention to claim herein any of the subject-matter disclosed in my prior application No. 512,320.

Having thus described the various features of the invention, what I claim as new and desire to secure by Letters Patent is:

A shiftable anchorage brake comprising articulated friction elements, a drum associated with said elements, a backing plate associated with said drum and said friction elements, a floating adjustable connecting device between the articulated ends of the friction elements shiftable as a unit with the elements and including a chamber in line with the ends of the friction elements, at least one plunger positioned for travel in the chamber and engaging the web of the associated friction element, an adjusting member threaded transversely into the connecting device and directly engaging the plunger in the chamber and operable to move the plunger longitudinally relative to the connecting device and having its outer end extending through an opening in the backing plate, a cover for the opening in the backing plate, and a spring acting upon said cover and said plunger.

ROBERT F. KOHR.